E. I. LAUDERBAUGH.
TRAP.
APPLICATION FILED SEPT. 16, 1915.
1,191,010.
Patented July 11, 1916.
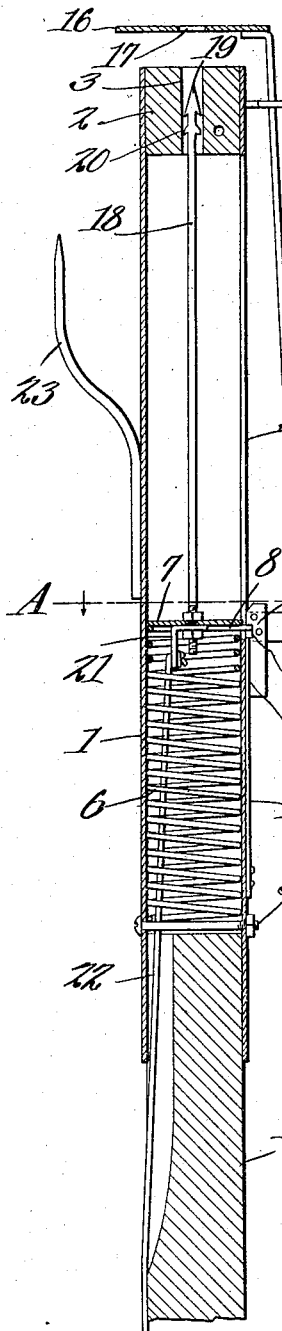
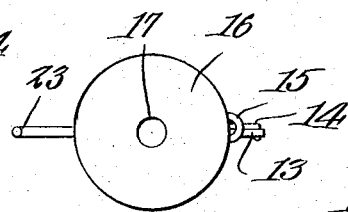
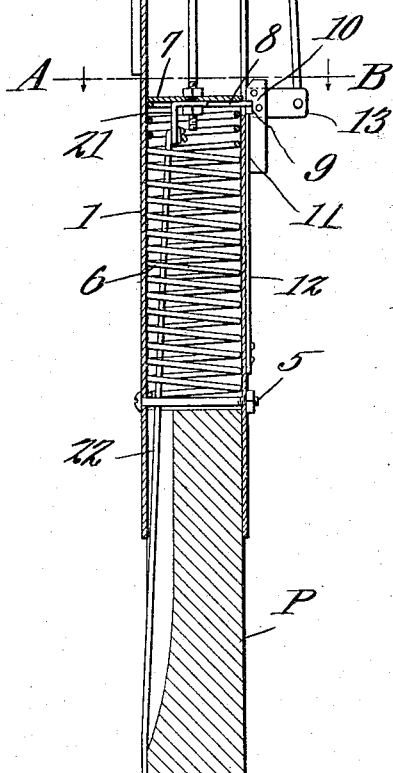
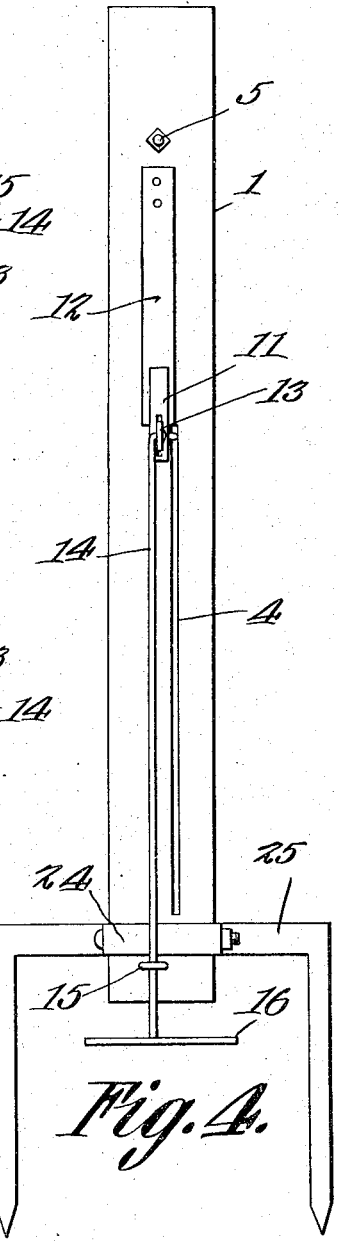
E. I. Lauderbaugh, Inventor,
by C. A. Snow & Co.
Attorneys.

UNITED STATES PATENT OFFICE.

ELMER I. LAUDERBAUGH, OF JASPER, MISSOURI.

TRAP.

1,191,010.  Specification of Letters Patent.  Patented July 11, 1916.

Application filed September 16, 1915.  Serial No. 51,049.

*To all whom it may concern:*

Be it known that I, ELMER I. LAUDERBAUGH, a citizen of the United States, residing at Jasper, in the county of Jasper and State of Missouri, have invented a new and useful Trap, of which the following is a specification.

This invention relates to impalement traps for catching birds and small fur bearing animals.

One of the objects of the invention is to provide a trap of this kind which is simple and compact in construction and which utilizes a tripping plate so positioned that when the same is shifted by the pressure of a bird or small animal, a steering element will be released and will impale the creature in the path thereof.

A further object is to provide a trap of this type which can be set up readily upon a post, which can be easily set, and which can also be used as an efficient mole trap.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a central longitudinal section through the trap in position upon a supporting post. Fig. 2 is a top plan view thereof. Fig. 3 is a section on line A—B of Fig. 1. Fig. 4 is an elevation of the trap arranged for use in impaling moles.

Referring to the figures by characters of reference 1 designates a tubular casing one end of which is provided with a plug 2 having a central opening 3. The other end of the casing is adapted to be placed in engagement with the upper end of a supporting post P or the like, and formed longitudinally within the upper portion of the casing 1 is a slot 4. Extending diametrically through the casing near its lower end is a bolt 5 constituting an abutment for one end of a coil spring 6 located in the casing. The other end of this spring is secured to a head 7 mounted to slide within the casing. This head 7 has a tongue 8 extending therefrom and through the slot 4, the said tongue being adapted to project into a notch 9 formed within the head 10 of a catch 11, said head 10 being arranged at one end of a leaf spring 12 secured to the casing 1. An arm 13 is fixedly connected to and extends outwardly from the head 10 and pivotally connected to this arm is a rod 14 which slides within a guide 15 outstanding from that end portion of the casing 1 in which the plug 2 is located. A tripping plate 16 is fixedly connected to the rod 14 and extends across but is spaced from that end of casing 1 containing plug 2, this plate being provided with an opening 17 alining with the opening 3.

Extending through the center of the head 7 is the threaded end of spear 18 having its pointed head 19 arranged to work within the opening 3, there being barbs 20 upon the spear and adjacent the head 19. A bracket 21 may be secured to the head 7 and fastened to this bracket is a cord 22 or the like, extending downwardly beyond the casing 1 and to a point where it can be reached conveniently by a person desiring to set trap.

It will be obvious that by pulling on the cord 22, head 7 will be drawn downwardly in the casing 1, thus compressing the spring 6. Ultimately, the tongue 8 will become seated in recess 9 so that the spring will therefore be held under compression and the head 19 of the spear will be held within the opening 3. The casing can be mounted on a post P and it will be found that when a heavy bird, or a small fur bearing animal places its weight on the tripping plate 16, said plate will move downwardly and will thrust against arm 13, thereby causing the head 10 of the catch to swing outwardly from engagement with tongue 8. Consequently, the spring 6 will be released and the head 7 will be thrust longitudinally of casing 1 while the spear will be projected beyond the plug 2 and through the opening 17 into the creature on the plate 16.

If desired, the trap can be connected to a tree or other support by driving into said support a prong 23 which is secured to the casing 1 as shown.

By clamping a collar 24 about that end of casing 1 containing the plug 2, this collar having a fork 25 extending from it, the trap can be used as a mole trap. When thus used the trap is inverted and the fork 25 is thrust into the ground over the burrow, plate 16 being placed against a depressed portion of the burrow so that, when the mole pushes upwardly against the soil at the depressed portion, the trap will be released and the spear will be thrust downwardly into the ground.

What is claimed is:

1. An impalement trap including a tubular casing having a longitudinal slot, a head slidably mounted in the casing, a spear extending therefrom, a tongue extending from the head and through the slot, a spring bearing against the head, means for moving the head in one direction against the action of the spring to place the spring under compression and to retract the spear into the casing, a spring catch for engaging the tongue to hold the spring under compression, a rod pivotally connected to the catch, a guide outstanding from the casing and slidably engaged by the rod, and a tripping plate fixedly connected to the rod and supported thereby beyond one end of the casing, said plate having a spear receiving opening.

2. An impalement trap including a tubular casing having a longitudinal slot, a head slidably mounted in the casing, a spear extending therefrom, a tongue extending from the head and through the slot, a spring bearing against the head, means for moving the head in one direction against the action of the spring to place the spring under compression and to retract the spear into the casing, a spring catch for engaging the tongue to hold the spring under compression, a rod pivotally connected to the catch, a guide outstanding from the casing and slidably engaged by the rod, a tripping plate fixedly connected to the rod and supported thereby beyond one end of the casing, said plate having a spear receiving opening, and a ground engaging fork detachably connected to that end of the casing adjacent the tripping plate.

In testimony that I claim the foregoing as my own, I have hereto affixed my signature in the presence of two witnesses.

ELMER I. LAUDERBAUGH.

Witnesses:
G. A. McVay,
N. H. Patterson.

Copies of this patent may be obtained for five cents each, by addressing the "Commissioner of Patents, Washington, D. C."